United States Patent [19]

Amieux

[11] 4,370,716
[45] Jan. 25, 1983

[54] ACTIVE NUTATION CONTROL SYSTEM FOR SPACE VEHICLE

[75] Inventor: Jean-Claude Amieux, Voisins le Bretonneux, France

[73] Assignee: Matra, Paris, France

[21] Appl. No.: 114,197

[22] Filed: Jan. 22, 1980

[30] Foreign Application Priority Data

Jan. 23, 1979 [FR] France .................. 79 01663

[51] Int. Cl.³ .......................... B64G 1/10; G05D 1/08
[52] U.S. Cl. .................................. 364/434; 244/3.22; 244/169; 364/459
[58] Field of Search ............... 364/434, 459; 244/169, 244/170, 171, 3.21, 3.22, 3.23, 3.28, 3.29

[56] References Cited

U.S. PATENT DOCUMENTS

| | | | |
|---|---|---|---|
| 3,558,078 | 1/1971 | Lanzaro | 244/169 |
| 3,624,367 | 11/1971 | Hamilton et al. | 364/434 |
| 3,643,897 | 2/1972 | Johnson, Jr. | 244/169 |
| 3,937,423 | 2/1976 | Johansen | 244/3.22 |
| 3,984,071 | 10/1976 | Fleming | 244/3.22 X |
| 4,023,752 | 5/1977 | Pistiner et al. | 244/169 |
| 4,096,427 | 6/1978 | Rosen et al. | 244/170 X |
| 4,174,819 | 11/1979 | Brüderle et al. | 244/170 X |

Primary Examiner—Felix D. Gruber
Attorney, Agent, or Firm—John T. Synnestvedt; Albert L. Free

[57] ABSTRACT

An active nutation control system for a space vehicle spinning about a geometric axis has thrusters for creating an external torque about an axis transverse to the first. The amplitude of the nutation and its phase in relation with the spinning movement are detected. A control arrangement receives signals from the nutation detectors, computes the changes in the angular direction of the angular momentum of the vehicle caused by thruster activation and energizes the thrusters when contemporaneously the amplitude of the nutation movement is greater than a predetermined threshold, the phase corresponds to maximum efficiency of said thrusters in reducing nutation momentum of the vehicle or at least does not increase it.

8 Claims, 7 Drawing Figures

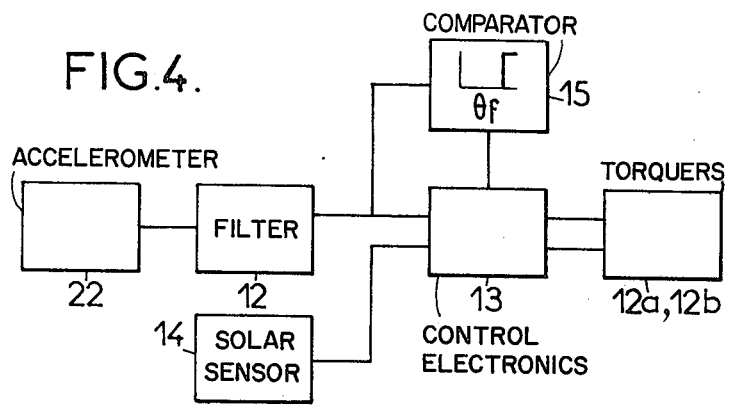
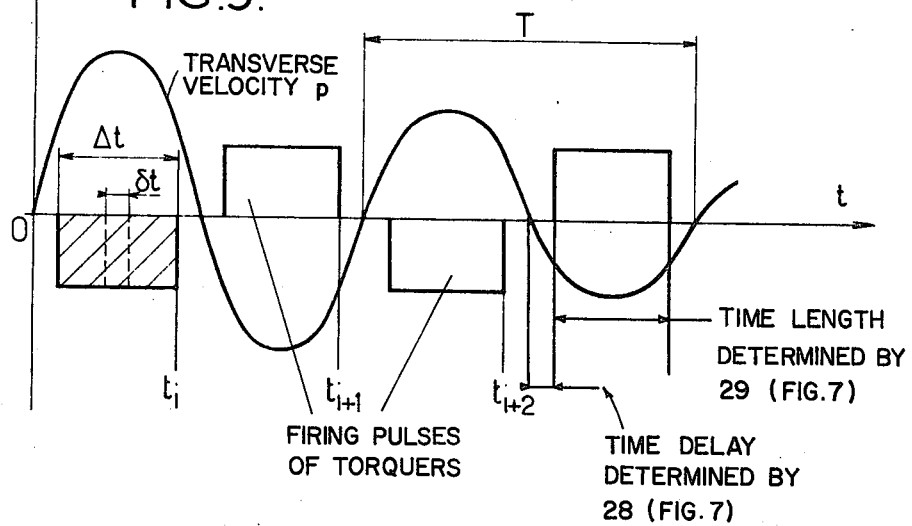
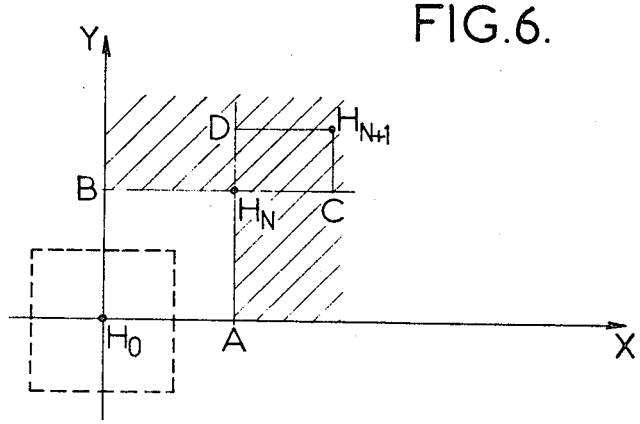

ACTIVE NUTATION CONTROL SYSTEM FOR SPACE VEHICLE

BACKGROUND OF THE INVENTION

The invention relates to control and damping of nutation of space vehicles which are spinning, i.e. have a rotational speed about one of their geometric axes, during at least certain phases of their missions.

By way of example, reference may be made to a satellite which, during its mission, first travels in a transfer orbit and then is brought by an apogee boost motor into a final geosynchronous orbit. As a general rule, the unit consisting of the satellite and its apogee boost motor is spin stabilized about the thrust axis of the motor before igniting the latter to inject the satellite into the final, for example geostationary, orbit. Some satellites are also spin stabilized in their final orbit.

It has been known for a long time that when a body rotates freely about its center of gravity, the geometrical axis (of maximum or minimum moment of inertia) about which the spinning is the highest, describes a movement of nutation about the direction of the momentum of the body. Nutation may develop under the effect of internal energy dissipations on board the body (slopping of liquids, flexibility of the structure, friction on bearings, for example, in the case of a space vehicle); it grows or decreases with time depending on whether the ratio $\lambda$ of the moment of inertia about the spin axis and the moment of inertia about transverse axes is less or greater than 1.

The amplitude of the nutation angle of a space vehicle should be controlled and restricted within limits which depend on the vehicle and the phase of the mission. Whenever it is possible to construct the satellite so that its constant spinning axis is the axis of maximum moment of inertia, damping of the nutation movement occurs naturally and it will be sufficient in general to enhance damping by using a passive damper. But practical requirements, such as the configuration of the launcher may lead one to construct the space vehicle so that the nutation will grow to such an extent that in the absence of an active control device, the vehicle would finally assume a "flat" movement of nutation, i.e. would tumble about an axis perpendicular to its nominal spin axis.

Active nutation control systems are already known which reduce the nutation angle by applying corrective torques. Typically, torquers using mass ejection are used. In such a case, the thrusters of the attitude control device of the vehicle are used for nutation control. The torque applied to the vehicle by the thrusters results in modification of the direction of the angular momentum of the vehicle in relation to an inertial reference. If the spin axis of the vehicle is the axis along which the thrust of the apogee boost motor is applied, it is essential that its angular direction be correct for achieving the required orbital parameters.

Consequently, it is important to minimize changes in the direction of the momentum (which direction is that of the spin axis of the vehicle after nutation damping) during the phase of nutation control and reduction of the amplitude of the nutation movement to an acceptable value.

To solve the problem on the satellite METEOSAT, a nutation damper was constructed which controls nutation by successive corrective actions in the form of torques, each due to several immediately successive pulses supplied by the thrusters, in directions such that they all tend to reduce the nutation, but approximately compensate each other insofar as the modification of the direction of the angular momentum of the satellite is concerned.

That approach is acceptable in the case of space vehicles whose ratio between the rotational and transverse moments of inertia is less than about 0.7. For configurations for which this ratio is between 0.7 and 1, the angular change of the momentum direction is very sensitive to the actuation of the nutation control means; for example, for certain ratios of moments of inertia, the change in the direction of the angular momentum due to an actuation sequence of the nutation control means is the sum of the shifts due to each actuation, and may become prohibitive for the mission.

SUMMARY OF THE INVENTION

It is an object of the invention to provide an active nutation control process which achieves decrease of the nutation with a satisfactory efficiency and a low overall change of the direction of the momentum. It is another object to provide a nutation control system which decreases the nutation value with a low energy consumption in active torquers and a limited change in the angular position of the vehicle angular momentum.

For that purpose, there is provided a process for controlling the nutation of a spinning space vehicle having a rotational speed about a geometrical axis of maximum or minimum moment of inertia, comprising the steps of:

deriving from the motion of the vehicle a periodic signal having an amplitude representative of the magnitude of the nutational motion of the vehicle and a frequency equal to the frequency of the nutational motion;

comparing said amplitude with a predetermined threshold value;

applying pulses of external rocking torque of predetermined time duration to said vehicle to change the direction of angular momentum of the vehicle, wherein one of said pulses is applied upon simultaneous occurrence of said amplitude exceeding said threshold, the phase of said one pulse with respect to said periodic signal corresponding to maximum efficiency of the torque pulse in reducing said nutation and said torque pulse reducing the discrepancy between the actual direction of the angular momentum of the vehicle and an initial direction of said angular momentum;

generating signals representing the changes of angular momentum of the vehicle due to said pulses; and storing the signals representing the changes of direction of the angular momentum due to the successive pulses.

That process achieves a high degree of efficiency of the nutation correction torques, rendering each nutation correction pulse highly effective by limiting the pulses to short durations, each pulse having a limited damping effect. That restriction is not troublesome for certain phases of the mission of the vehicle, when the amplitude of the nutation movement is small and cannot increase quickly; on the other hand, this is not true for other phases of the mission, at least for certain vehicles. The problem is solved by selecting one of two types of operation, depending on whether the amplitude of the nutation movement is greater or less than a predetermined threshold, depending on the parameters of the vehicle.

Above this threshold, the nutation may increase rapidly and it is necessary to dampen the movement—which may be catastrophic for the mission of the vehicle—as rapidly as possible, by using the maximum possible duration of actuation of the torque-creating means. Below the threshold, a smaller duration of actuation is used whereby the yield is improved and fuel consumption is decreased. In that second phase, there is a sequence of pulses. During the first phase, the external correction torque is maintained for the whole period when it tends to reduce nutation, but at the same time the changes in the direction of the angular momentum are stored in a memory. The stored information thus obtained is used at the beginning of the second phase to control the sequence of actuation pulses in order to eliminate the stored overall change at the same time as the nutation is further decreased.

According to another aspect of the invention, there is provided an active nutation control system for a space vehicle spinning about one of its geometrical axes, having: means for creating an external rocking torque about an axis transverse to said geometrical axis; means for measuring the nutation value and the nutation phase in relation to the spinning movement; and an arrangement for controlling the torque creating means connected to receive input signals from the measuring means, wherein said control arrangement comprises means for computing the changes in the orientation of the momentum of the vehicle due to the torque creating means, and comparator means for energizing said torque creating means when the nutation value is greater than a predetermined threshold, the phase corresponds to maximum efficiency of said torque creating means in reducing nutation, and the action of said torque reduces the angular discrepancy between the actual momentum of the vehicle and the initial momentum, or at least does not increase it.

BRIEF DESCRIPTION OF THE DRAWING

The invention will be better understood from the following description of a nutation control system according to a particular embodiment given by way of example as well as of the process which it carries out. The description refers to the accompanying drawings, in which:

FIG. 4 is a simplified block diagram of a system delivering torque pulses;

FIG. 5 shows the variation in time of the transverse speed p about axis Gx of a satellite during nutation damping;

FIG. 6 is a diagram showing the influence of the energization of the nutation damping means on the angular position of the momentum $\vec{H}$, in absolute axes;

DESCRIPTION OF THE PREFERRED EMBODIMENT

Before the invention is described, it may be useful to recall some considerations on the problem of nutation control of a space vehicle which will be assumed in what follows to be a spin-stabilized satellite, i.e. a satellite spinning at a constant angular speed about one of its geometric axes.

Figure 1:
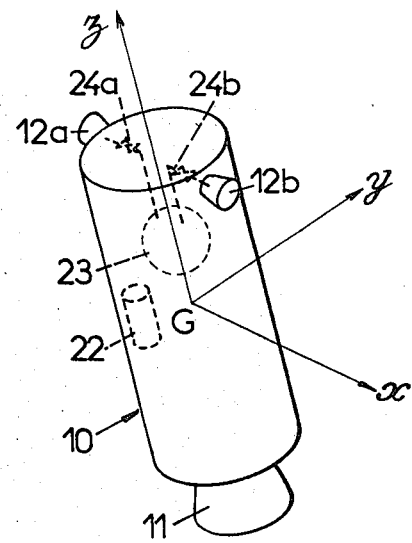
FIG. 1 is a simplified diagram showing the natural or principal axes of the vehicle provided with a damping system.

Referring to FIG. 1, a satellite 10 has a geometric axis Gz passing through its center of mass or center of gravity G. The apogee boost motor 11 of the satellite is positioned to deliver a jet along direction Gz. Two axes Gx and Gy may be defined perpendicular to Gz and forming the principal inertia axes of the satellite. When the latter is spinning at a constant rate about axis Gz, the movement of nutation due, for example, to internal energy dissipation tends to decrease naturally if the moment of inertia along the spin axis Gz is greater than the moment of inertia about the transverse axis Gx and Gy. This condition was satisfied in the first satellites to be launched. On the other hand present day launchers and those contemplated, in particular the space shuttle, require the design of satellites having an elongated shape. Then the value of the nutation tends to increase spontaneously, according to an approximately exponential law.

Figure 2:
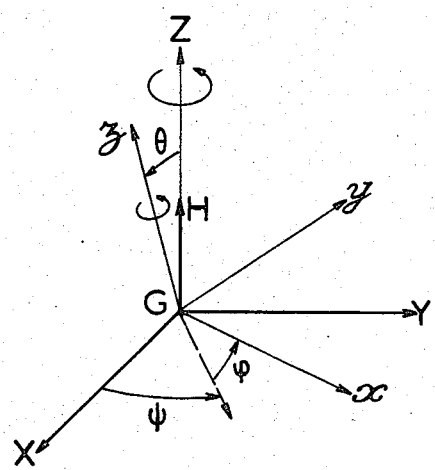
FIG. 2 is a diagram showing the notations used in a reference frame of absolute (or inertial) axes X Y Z.

Nutation of the satellite may be defined by using the notations shown in FIG. 2 where $\vec{GZ}$ designates the initial direction of the momentum $\vec{H}$ and forms, with GX and GY, an inertial or absolute system of axes. If the nutation angle is designated by $\theta$, the spin angle by $\phi$ and the precession angle by $\psi$, the equations of motion are:

$$\begin{cases} \dot{\psi} \sin\theta = p \sin\phi + q \cos\phi \\ \dot{\theta} = p \cos\phi - q \sin\phi \\ \dot{\phi} = r - \dot{\psi} \cos\theta \end{cases}$$

where p, q and r are the rotational speeds or rates of the satellite about axes Gx, Gy and Gz.

It will first be assumed that the means used for controlling satellite nutation are two nozzles 12a and 12b supplying gas jets in opposite directions parallel to axis Gx and consequently supplying a rocking torque about Gy.

The instant at which the gas jets of the nozzles have maximum efficiency on the momentum of the satellite and the length of the pulse during which the gas jets should be activated, can be computed.

Outside periods of rapid growth of the nutation angle, the assumption that $\dot\theta=0$ may be made. The equations above may then be written:

$$\begin{cases} \phi = (1 - \lambda) rt + \phi_0 \\ \psi = \dfrac{\lambda r t}{\cos\theta} \end{cases}$$

where $\lambda$ designates the inertia ratio of the vehicle.

Axis Gz moves along a cone, whose half angle at the apex is $\theta$, about GZ, at angular speed or rate $\dot\psi$.

If angle $\theta$ is small, then:

$$\dot\psi \simeq \lambda r$$

and $$\dot\psi + \dot\phi \simeq \lambda rt + (1-\lambda) rt = rt$$

Figure 3:
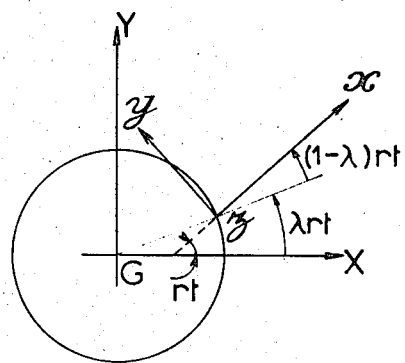
FIG. 3 is a projection diagram on plane X Y.

The projection of the vectors in plane XY is then as shown in FIG. 3.

The maximum efficiency of a pulse $I \cdot \Delta t$ of very short duration $\Delta t$ in decreasing the movement of nutation is obtained when the nozzle is directed in direction Y, i.e. when q is maximum and when $p=0$. The speed q is then instantaneously reduced by:

$$\Delta q = I \cdot \Delta t / B$$

(B being the inertia of the satellite about Gy).
The nutation angle is then decreased by $\Delta \theta$:

$$\Delta \theta = \frac{\Delta p}{\lambda \cdot r} = \frac{I \cdot \Delta t}{H}$$

If the nutation-correcting torque is maintained for an appreciable time period, it will tend to reduce $\theta$ as long as I and q have opposite signs and to increase $\theta$ when I and q have the same sign. But the efficiency of the system in reducing nutation will be all the more reduced when the absolute value of p/q is high.

To spare fuel, it will always be desirable to actuate the nozzles only for brief periods of time corresponding to the maximum efficiency. But, in certain phases of operation, it will be necessary to have a maximum correction effect, at the price of a loss of efficiency.

Two operational phases are typically to be considered, according as to whether the angle of nutation $\theta$ is greater or smaller than a predetermined threshold. That threshold, which may be qualified as coarse, may be chosen to correspond to an intermediate value between the initial condition and the residual angle specified for the mission. The acceptable residual angle may be regarded as a "fine" threshold, below which no nozzle actuation for nutation control is allowed.

For nutation amplitudes greater than the "coarse" threshold, the torque-creating means (here each nozzle in turn) will be used for the whole of the time that they exert a damping effect, thus providing maximum stabilization. The drift of the momentum during this phase is computed and stored to be used during the second phase.

The second phase begins when the amplitude of the nutation movement is less than the coarse threshold. During the second phase, the torque creating means will only be energized for those short time periods during which they have maximum efficiency.

During the second phase, the actuation of the torque creating means (i.e. authorization to fire a nozzle in the embodiment illustrated) is effected if and when three conditions are simultaneously fulfilled:

—the amplitude of the nutation exceeds the "fine" threshold which is substantially less than the "coarse" threshold and represents the permanently tolerable maximum, for example 0.1° if the coarse threshold is 3°;

—the angle $(1-\lambda)rt$ is such that the pulse has maximum efficiency in reducing nutation;

—the comparison of the computed action of the pulse with the stored value of the amount of drift of the momentum direction shows that the pulse will decrease the discrepancy between the current direction of the angular momentum and its initial position.

The sequence of correction pulses is then discontinuous and results in a cumulative drift of the direction of angular momentum over the entire mission which is much reduced below the drift which would occur in the absence of the correction pulses, whatever the duration of operation.

The basic elements of the system may be as shown in FIGS. 1 and 4. Referring to FIG. 1, there are schematically shown a fuel tank 23 supplying nozzles 12a and 12b through lines provided with valves 24a and 24b, respectively. The transverse speed, representative of the nutation movement, is measured by an accelerometer 22 located in the xy plane far from the spin axis Gz and whose sensitive axis is parallel to Gz. Referring to FIG. 4, the control electronics receive the output signal from accelerometer 22, as well as a rotation reference signal, supplied for example by a solar sensor 14 (not shown in FIG. 1) which delivers a short pulse at the moment when the sun comes into its field of view. The signal of accelerometer 22 is processed in a low-pass filter 12. The processed signal is applied to control electronics 13 controlling the nozzles. It is also applied to a comparator 15 serving as a threshold detector. The output signal of sensor 14 is fed to a sine/cosine generator which is part of electronics 13. The signal of sensor 14 operates as a synchronizing signal for the sine/cosine generator whose period is equal to the spinning period of the vehicle.

The word "synchronization" is to be understood as indicating that sensor 14 imposes on the generator a frequency equal to the spinning frequency of satellite 10.

The role of the generator which supplies signals representative of the sine and the cosine of the spinning angle of satellite 10 is important. That role will appear for computation of the change of direction of the total angular momentum $\vec{H}$ caused by a sequence, of cyclic actuations of the nozzles 12a and 12b with appropriate phases in relation to the nutation movement.

Referring to FIG. 5, there is shown a curve representative of the variation of the angular velocity or rotation rate p of the satellite about the transverse axis Gx depending on time t and on the duration $\Delta t$ of actuation of nozzles 12, when control is for practically maximum damping action. If the projection of the tips of the momentum vectors, at the initial instant and at the end of pulse No. N, in plane XY of the inertial reference frame (FIG. 6) are designated $H_0$ and $H_N$, computation with complex variables shows that:

$$(H_0 H_N) = (H_0 H_1) \sum_{i=0}^{N} (-1)^i \exp[jr(t_i - t_0)]$$

The projection of the ratio $H_0 H_N / H_0 H_1$ in the plane of axes X and Y may then be expressed by two real quantities A and B which can be computed from the outputs of the sine-cosine generator at each instant $t_i$; with $t_0 = 0$:

$$A = 1 - \cos rt_1 + \cos rt_2 - \ldots (-1)^N \cos rt_N$$

$$B = -\sin rt_1 + \sin rt_2 - \ldots + (-1)^N \sin rt_N.$$

Such terms provide a full representation of the magnitude and direction of the drift of the angular momentum.

These formulae are valid based on the assumption that the time periods of actuation are centred in relation to the cycles of the transverse speed p(t) as shown in FIG. 5.

There may also be calculated, after the Nth actuation (N being an integer), two real quantities C and D representing the effect which a (N+1)th actuation will have on the angular direction of the momentum vector; for $t_{N+1} = t_N + T/2$:

$$\begin{cases} C = (-1)^{N+1} \cos rt_{N+1} \\ D = (-1)^{N+1} \sin rt_{N+1} \end{cases}$$

The formulae are valid whether or not the (N+1)th actuation has the same duration as the preceding ones, as long as it is centred in relation to a cycle of p(t) and a proportionality factor is used.

The comparison between A and C and between B and D enables one to determine whether the (N+1)th actuation scheduled to finish at instant $t_{N+1}$, tends to decrease or further increase the discrepancy with the initial momentum $\vec{H}_0$ or, in other words, whether the length $(H_0 H_{N+1})$ will be greater or not than $(H_0 H_N)$. The criterion for the (N+1)th actuation or command then appears in FIG. 6: when A and B are positive the actuation is inhibited; the actuation will only be allowed if C and D are both negative. More generally, the actuation will be inhibited until, for a pulse finishing at $t_N + m(T)/(2)$, one of the following conditions is fulfilled:

$$(A < 0, C > 0) \text{ and } (B > 0, D < 0) \quad (1)$$
$$(A > 0, C < 0) \text{ and } (B > 0, D < 0)$$
$$(A > 0, C < 0) \text{ and } (B < 0, D > 0)$$
$$(A < 0, C > 0) \text{ and } (B < 0, D > 0)$$

Two kinds of systems may be designed based on that approach. In a first kind, the device is designed to have only one type of operation, damping occurring by firing the nozzles in pulses of duration δt, short as compared to the half-period of nutation.

The comparator 15 is then provided to supply an output signal when the amplitude of the nutation is greater than a threshold $\theta_f$ which represents the maximum tolerable value and forms the above-mentioned fine threshold.

Authorization to fire one or the other of the nozzles 12a and 12b during period δt is then given by the electronic means 13 when the three following conditions are simultaneously fulfilled:
- nutation value greater than threshold $\theta_f$;
- one of relationships (1) is satisfied;
- a time (T)/(4)-(δt)/(2) has elapsed since zero crossing of the speed of rotation about x (given by detector 22).

Figure 7:
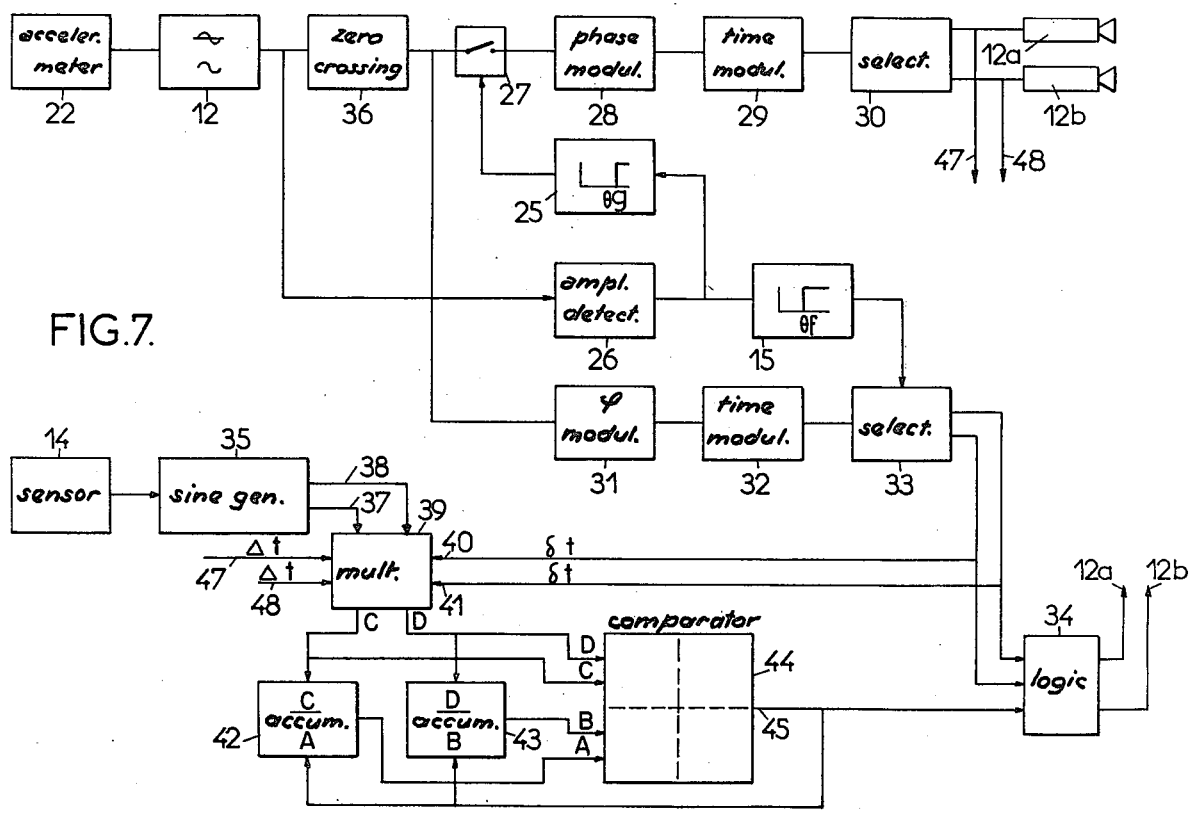
FIG. 7 is a block diagram of a system whose operation is different during different phases of the mission.

In the other kind of system, two different types of operation are provided, depending on whether the angle of nutation $\theta$ is greater or not than a so-called "coarse" threshold $\theta_g$; the block diagram of the system may then be as shown schematically in FIG. 7.

Referring to FIG. 7, there is again illustrated a nutation detector 22 provided with a low-pass filter 12 and a sensor 14 supplying a spin reference. It will be assumed that detector 22 is an accelerometer with a sensitive axis parallel to Gz and supplying a signal representative of the transverse speed p. But other detectors may also be used such as linear accelerometer, gyrometer, integrating gyroscope, free or strapped down inertial platform, earth's horizon sensor, solar acquisition sensor, star sensor or radio frequency sensor. As for sensor 14, it is sufficient for it to supply information about the spinning frequency of the satellite; it may be quite simple: an internal low drift clock supplying signals at a frequency close to the spinning frequency of the vehicle may be satisfactory.

The periodic signal p(t) from filter 12 (FIG. 7), which is of substantially sinusoidal shape, is applied to an amplitude detector 26 supplying a signal representative of $\theta$ which is applied to threshold comparators 15 and 25. The periodic signal is also applied to a zero cross-over detector 36 whose output signals will be used to apply the pulses of duration Δt or δt (FIG. 5) with the appropriate phase, corresponding to firing of the nozzles during periods of duration δt or Δt centered within the cycles of p(t) (FIG. 5).

Starting from the zero cross-over detector 36, the system comprises two branches, one or the other of which comes into action depending on whether the amplitude of $\theta$ is greater than the coarse threshold $\theta_g$ or not.

The first branch comprises an input relay 27 which is closed by the comparator 25, whose threshold is $\theta_g$, when $\theta > \theta_g$. It also comprises a phase modulator 28 and a time duration modulator 29. The latter is adjusted to determine the duration Δt of each actuation. Modulator 28 is adjusted as a function of Δt so that the pulses supplied by the nozzles are centered within the cycles of p(t) and consequently have maximum efficiency. For that purpose, modulator 28 authorizes energization after a predetermined delay has elapsed from zero-crossing. The signals of duration Δt from modulator 29 are alternately directed to nozzles 12a and 12b by selection and firing logic 30.

Nozzles 12a and 12b will generally be hot gas ejection nozzles supplied with hydrazine or a mixture of two liquids. However, other torque creating means may also be used, either mass ejection means (for example cold gas thrusters) or ionic means, or even electromagnetic means operating in cooperation with the ambient medium, such as with the earth's magnetic field.

The second branch comes into action when relay 27 is open. It also comprises a phase modulator 31 and a time duration modulator 32; this latter supplies signals of duration δt (FIG. 5) distinctly shorter than Δt, so that the yield of the pulses supplied by the nozzles is close to maximum. The output signals from modulator 32 are applied to selection and inhibition logic 33 which determines which one of the nozzles 12a and 12b is to be fired. Logic 33 only transmits a signal to the firing logic 34 of the nozzles when it receives from threshold comparator 15 a signal indicating that the nutation angle $\theta$ is greater than the fine threshold $\theta_f$.

The firing logic 34 is associated with a circuit, described below, which, when the nutation angle $\theta$ is between $\theta_f$ and $\theta_g$, only allows ignition of a nozzle if its action does not increase a discrepancy, already greater than a predetermined threshold illustrated by the frame in broken lines in FIG. 6, existing between the direction of the current angular momentum and the initial (i.e. before any nutation damping) direction of the momentum; in other words, the nozzle is inhibited if it causes a drift increase.

The electronic circuit comprises sensor 14 which synchronizes the sine and cosine function generator 35. Signals representative of sin rt and cos rt are delivered at outputs 37 and 38 of generator 35 and are applied to two inputs of a multiplier 39. This multiplier is wired to form the above-defined terms C and D by multiplying $(-1)^{N+1} \delta t$ with $\cos rt_{N+1}$ and $(-1)^{N+1} \delta t$ with $\sin rt_{N+1}$. For that purpose, it receives, at two other inputs 40 and 41, the electrical signals representing duration δt fed by the selection logic 33 to the firing logic 34. When relay 27 is open and the first branch of the electronic means is therefore out of action, circuit 39 forms the products of each of the output signals of the logic (which represents, in magnitude and in sign, a pulse of duration δt) multiplied by sin rt and cos rt. The electrical signals representative of the products are applied to respective accumulators 42 and 43 and to two inputs of a comparator circuit 44. The accumulators 42 and 43 comprises an input buffer memory which stores the terms C and D till receipt of an enabling order which will be defined later. Comparator 44 also receives signals A and B formed by summation of the earlier terms C and D and storage in accumulators 42 and 43 and determines if one of the above conditions (1) is satisfied. In the affirmative, an enabling signal appearing at output 45 is applied to logic 34 and allows transmission of signals for firing the nozzles by logic 34 and the addition of the contents of the buffer memories in accumulators 42 and 43, to form A+C and B+D, which constitute new terms A and B.

Multiplier 39 also receives, at inputs 47 and 48, those signals which control actuation of the nozzles, which signals are supplied by the selection and firing logic 30. Corresponding terms C and D are fed to accumulators 42 and 43 and are automatically summed, nutation damping having to take place during this phase of operation with $\theta > \theta_g$, whatever the effect of the actuation of the nozzles on the direction of the angular momentum. Summation may take place by maintaining an enabling signal at the inputs of accumulators 42 and 43.

The operation of the system will now be described with particular reference to the launching of a geosynchronous satellite. The satellite is first located in a transfer orbit. Then, its apogee boost motor is fired to move it along an injection orbit into a final geostationary orbit.

Since the nutation is prone to increase dramatically during the injection step, it is essential that the nutation damping system have maximum effect during that stage.

As long as the satellite orbits prior to injection, there is much likelihood that operation of the branch which is activated upon increase of the nutation magnitude above the fine threshold $\theta_f$ will be sufficient to control nutation. As long as that condition is maintained, switch 27 will continuously remain open. The accumulated change in the direction of the angular momentum will be permanently determined by summing the contributions of each correction pulse of duration δt in accumulators 42 and 43. The comparator circuit 44 will authorize application of a further correction pulse only if it does not further increase the deviation of the angular momentum from its original position. Upon each firing pulse, the corresponding terms C and D computed by multiplier 39 from the sine and cosine signals received from generator 35 and from the proportionality factors ±δt received from selection logic 33 will be summed with the former value of A and B.

The same type of operation will generally occur in geosynchronous orbit.

On the other hand, fast increase of the nutation magnitude may occur during the injection into the final geosynchronous orbit. As soon as the magnitude exceeds $\theta_g$, then pulses of duration Δt are applied by the chain consisting of units 28, 29 and 30 whatever the effect of the pulses on the direction of the angular momentum. Multiplier 39 will no longer receive pulses δt, but it will receive pulses Δt at inputs 47 and 48. Then, it will deliver terms C and D which will be summed with the values of A and B respectively stored in accumulators 42 and 43.

The large values of A and B which may be attained will be progressively decreased during nutation damping which will occur while the satellite is geostationary.

The control electronics which have been described may be digital, analog or hybrid. The nutation control nozzles may also be used for other functions. It is not necessary to describe the circuits in detail here, for each one of them may be conventional. An initialization system should be provided, as well as means which, when A and B are less than a threshold (i.e. when the discrepancy $H_O H_N$ is less than a definite value considered as tolerable), allow the firing of the nozzles whatever the result of the comparison made by 44.

The invention is not limited to the particular embodiments which have been illustrated and described by way of examples and it should be understood that the scope of the present patent is limited only by the following claims.

I claim:
1. A process for controlling the nutation of a spinning space vehicle having a rotational speed about a geometrical axis of maximum or minimum moment of inertia, comprising the steps of:
    deriving from the motion of the vehicle a periodic signal having an amplitude representative of the magnitude of the nutational motion of the vehicle and a frequency equal to the frequency of the nutational motion;
    comparing said amplitude with a predetermined threshold value;
    applying pulses of external rocking torque of predetermined time duration to said vehicle to change the direction of angular momentum of the vehicle, wherein one of said pulses is applied upon the simultaneous occurrence of said amplitude exceeding said threshold, the phase of said one pulse with respect to said periodic signal corresponding to maximum efficiency of the torque pulse in reducing said nutation and said torque pulse reducing the discrepancy between the actual direction of the angular momentum of the vehicle and an initial direction of said angular momentum;
    generating signals representing the changes of angular momentum of the vehicle due to the pulses; and
    storing the signals representing the changes of direction of the angular momentum due to the successive pulses.
2. A process according to claim 1, wherein said external torque is created by mass ejection in a direction having a component transverse to said geometrical axis of the vehicle and at a distance from the mass center of the vehicle.
3. A process according to claim 2, wherein the mass ejection is effected along one or other of two opposite directions, parallel to said transverse axis and presenting a lever arm in relation to the mass centre of the vehicle.
4. An active nutation control system for a space vehicle spinning about one of its geometrical axes, having: means for creating pulses of external rocking torque about an axis transverse to said geometrical axis; means carried by said space vehicle for delivering a periodically varying signal having an amplitude representative of the magnitude of the nutation of said space vehicle and a frequency equal to the nutation frequency of said space vehicle; and control means for controlling the torque-creating means, comprising:

first enabling means to deliver a signal authorizing actuation of said torque creating means for delivering a pulse of predetermined time duration at times having a predetermined phase difference with respect to said periodically varying signal;

second enabling means to compare said periodically varying signal with a predetermined threshold and to deliver a signal when the amplitude of said signal exceeds said threshold;

third enabling means connected to receive signals representative of the pulses to be delivered by said torque-creating means for computing the cumulative change in the direction of the angular momentum of the space vehicle due to the actuation of said torque-creating means and to deliver a signal under conditions where the next pulse does not increase the angular discrepancy between the current direction of the angular momentum of the vehicle and the initial direction thereof;

and means responsive to the signals from said first, second and third means for causing delivery of one of said pulses upon simultaneous occurrences of all three signals.

5. A system according to claim 4, wherein the control means comprise a generator of sine-cosine functions at the spinning frequency of the vehicle about said geometrical axis, means for supplying a signal whose value and polarity are representative of the value and direction of the external torque creating means, multiplier means for supplying the product of the sine and of the cosine of the frequency of rotation and said signal, respectively, and accumulators for summing said products and storing the summed products, and wherein said comparator means has inputs connected to receive signals representative of the contents of the accumulators and inputs connected to receive signals from the multiplier and outputs connected to allow actuation of the torque creating means when the sign of each signal from the multiplier is opposite the sign of the contents of the respective accumulator.

6. A process for controlling the nutation of a spinning satellite having a rotational speed about a geometrical axis of maximum or minimum moment of inertia, during a mission comprising one phase during which the magnitude of the nutational motion is liable to increase only slowly and another phase during which the nutation is liable to increase at a high rate, comprising the steps of:

(a) deriving from the motion of the satellite a periodic signal having an amplitude representative of said magnitude and a frequency equal to the frequency of nutational motion of said satellite;

(b) during said one phase,
  (1) comparing said amplitude with a predetermined fine threshold value,
  (2) applying pulses of external rocking torque of predetermined time duration δt to said satellite,
  (3) generating signals representing the changes of angular momentum of the satellite due to said pulses,
  (4) one of said pulses being applied upon simultaneous occurrence of said amplitude exceeding said first threshold, the angular phase of said one phase with respect to said periodic signal corresponding to maximum efficiency of the torque pulse in reducing said nutation, and said torque pulse reducing the discrepancy between the current direction of the angular momentum of said satellite and an initial direction of said angular momentum, and
  (5) storing said signals representing the changes of angular momentum of said satellite due to said pulses; and (c) during said another phase,
  (1) comparing said amplitude with a predetermined coarse threshold value,
  (2) applying pulses of external rocking torque for the whole duration of the time when said amplitude exceeds said coarse threshold and when doing so tends to reduce said nutation,
  (3) generating signals representing the changes of angular momentum of the satellite due to said last-named pulses; and
  (4) storing said last-named signals representing changes of angular momentum.

7. A process according to claim 6, wherein said one phase comprises movement of the satellite in a transfer orbit and in its final geosynchronous orbit and said another phase comprises movement in an injection orbit.

8. An active nutation system for a space vehicle spinning about one of its geometric axes, comprising:

thruster means carried by said vehicle and located to exert an external torque about at least one second axis transverse to said one geometric axis when activated, means for producing signals representing the amplitude and phase with respect to an absolute reference of the nutation of said vehicle, a first control branch supplied with said signals for causing activation of said thruster means for substantially the complete periods for which they are effective in decreasing nutation, first comparator means connected to said amplitude detecting means and arranged to deliver a signal rendering said first control branch operative whenever said amplitude exceeds a predetermined threshold, a second control branch supplied with said signals for causing activation of said thruster means in short pulses at times when they are most effective in decreasing nutation, second comparator means connected to said amplitude detecting means and arranged to inhibit said second control branch whenever said amplitude is lower than a second threshold lower than the first, computer means to receive signals from said first and second branches and to determine drift of the direction of the momentum vector of said vehicle responsive to successive activations of said thruster means, memory means connected to said computer means to store signals representative of the accumulated drift, and comparison means connected to said computer means and memory means and arranged to inhibit activation of the thruster means by said second branch when the computed effect of said activation is an increase of said drift.

* * * * *